Figures 1, 2:
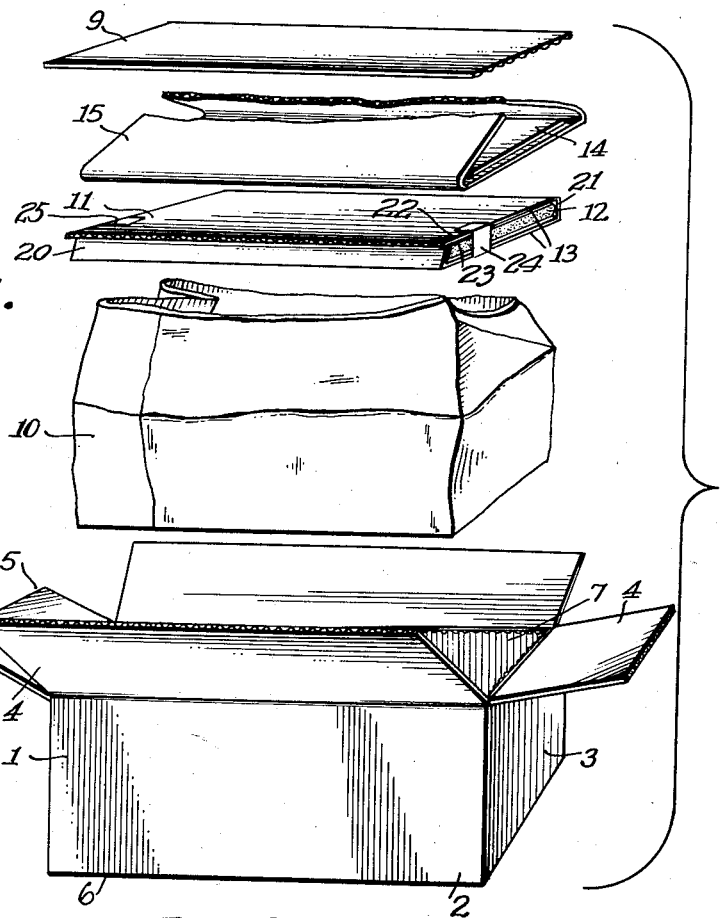

March 7, 1939.  R. L. BANGS  2,149,412
CONTAINER
Original Filed Oct. 24, 1932

Inventor.
Ralph L. Bangs.

Patented Mar. 7, 1939

2,149,412

UNITED STATES PATENT OFFICE 2,149,412

CONTAINER

Ralph L. Bangs, Wakefield, Mass., assignor to Forest Wadding Company, Boston, Mass.

Original application October 24, 1932, Serial No. 639,265. Divided and this application April 19, 1935, Serial No. 17,211

4 Claims. (Cl. 62—91.5)

This invention relates to containers, and more particularly to containers for perishable products as foods which must be kept at a constant cool temperature to prevent spoiling, and is a division of my prior application, Serial No. 639,265, filed October 24, 1932, now matured into Patent No. 2,006,705, issued July 2, 1935.

In packing or preserving foods with a refrigerant, great care must be maintained, as the use of too much refrigerant or its too close proximity to the food causes the food to become so stiff and to need prolonged thawing, and the use of too little refrigerant, or the improper packing causes the food to spoil. It is thus essential that it be properly placed and that the container be securely constructed.

An object of my invention is to construct a refrigerant container for packing and preserving foods to maintain a constant cold temperature therein and eliminate any danger of the spoiling of its contents.

An object of my invention is to construct a refrigerant container in which all the food or material in the container is maintained at approximately the same temperature.

Another object of my invention is to provide a container having an air insulating layer protecting the top and bottom of the packed material without weakening the construction of the package.

A further object is to provide an insulated container which can be opened easily and the packed material exposed without the trouble of removing numerous layers of insulating materials.

In the present invention, the food to be shipped in the container, such as fish or vegetables which are perishable are packed in the container or box with an insulating layer above the food and the refrigerant above that, so that a slow uniform cool circulation is obtained while the food is sealed in the container. When, however, the container is opened and the food exposed for sale, the container is opened at what was the bottom, and the top with the refrigerant is therefore beneath the food and helps to preserve it. If the container were opened at the top, the refrigerant would likely to be thrown away.

In the container of the present invention there is positioned above the inner envelope a flat cardboard container open at both ends and having an insulating lining between the two surfaces. This special insulating pad serves not only as a means of circulating the cold from the dry ice on the side away from the food, but also prevents contact with the cold with the food itself. Construction of the pad together with the arrangement of the element within the bag provides a very satisfactory result as far as the preservation of the food is concerned. The food is kept at a reasonably cold temperature, but not absolutely hard, unless a large quantity of dry ice is used. With ordinary quantities of dry ice, the food will be preserved in a cold condition for a long period of time without freezing taking place. This condition is in part accomplished because the cold is supplied to the food in a definite relation to the radiation of the cold from the container itself, so that quick freezing is effectively avoided.

Without enumerating other advantages of the present invention, it will be described more in detail in connection with the drawing, in which:—

Figure 1 shows in perspective the elements of the container in their successive positions of assembly, and Figure 2 shows a vertical section through an open inverted container.

A container 1 is built in the usual manner with sides 2 and end pieces 3. The top and bottom of the container are constructed in the usual manner by bending covering flaps 4, extending in either direction from the sides and ends to a horizontal position and then sealing the bent flaps together. On one side of the container 6 is sealed as the bottom, the top 5 being left open for packing.

The sides of the container are lined by the vertically corrugated or fluted piece 7, extending completely around the inside of the container, and the bottom and top of the container are protected and made strong by the corrugated pieces 8 and 9 respectively.

As indicated in Figure 1 there is placed within the box or container 1 a flexible bag envelope or container substantially filling the entire space within the outer container 1 and in itself forming an inner container. This bag is placed over the corrugated bottom plate 8 and may be folded loosely at the top after the material has been packed within it.

The container 10 may be and is preferably water-proof, either by means of water-proof liner or because the container itself is water-proof.

When the material or goods to be preserved are placed within the container 10, the top is folded down and above this or over the top is placed the insulating pad 11. The pad 11 is formed of corrugated or cardboard sheet, which is scored along lines to allow creases to be made in the sheet so that it can be folded over to form a pad with top and bottom cardboard elements 13 and side cardboard elements 20 and 21.

As indicated in Figure 1, the pad may be so constructed that the end of the sheet used in forming the pad lies in face to face relation to the beginning of the pad as indicated by the position of the top piece 22 lying over the lower piece 23 forming the top cover 13 of the pad. Within the top and bottom covers of the pad, there is provided an insulating wadding 12. The ends of the pad may be sealed by strips 24 and 25, holding not only the wadding between the top pieces in place, but securing the top sheet of the pad to the bottom, so that it will not unfold. The wadding 12 may be a fleece material made of a combination of cotton and jute or it may be a cellulose or batte or even a mass of ground wood pulp. As has been previously stated this material aids in insulating the food stuffs from the refrigerant so as to prevent excessive cold reaching the stored food. This pad together with the fluted pieces 7 forming a liner within the outer bags and external of the inner container, provides a circulating passage for the cold air and uniformly distributes the cold, bringing about an even temperature throughout the whole material.

Resting on the pad 11 is the refrigerant 14 encased in a folder 15 or sheath for easy handling and to prevent a too quick dissipation of the refrigerant. Above the refrigerant is the top stiff corrugated piece 9, which helps to prevent the loss of cold, and adds strength to the container 1 when sealed.

The container 1 is now sealed by bending over the side and end flaps 4 to a horizontal position and sealing the bent flaps together. In this arrangement the refrigerant is encased and protected from quick dissipation by the protective piece 9 and the top cover of the container 10 on one side of the refrigerant and on the other side of the refrigerant by the pad 11 and the inner container 10 having the material to be stored.

Now, by inverting the container 1, the refrigerant rests below the packed material, and the cold dissipating from the refrigerant passes upward and through the packed material retaining it at an even cool temperature. When the packed material is to be taken from the container, the part of the container 6, formerly the bottom, but which on inverting, becomes the top, is opened, the same dissipation of cold upward through the packed material, takes place, and the packed material gets the full benefit of the refrigerant with a minimum of loss of refrigerant and retains a constant uniform temperature.

Having now described my invention, I claim:

1. A container for holding and preserving food, comprising a corrugated outer box having vertically extending flutings on the side thereof, an inner water-proof container substantially filling the entire inside of the box, said container being initially closed at one end and open to receive the food at the other end, the inner container adapted to be closed when the food is placed therein, an insulating pad consisting of cardboard layers with padding therebetween positioned above the inner container, an enclosed refrigerant placed above said pad, and means covering the top of the container including a board element placed above the refrigerant.

2. A method of packing food stuff to maintain the same in a cool state during shipment and sale, which comprises initially packing the food stuff with a solidified gaseous refrigerant at the top thereof and with a provision for circulation of the refrigerant gases about the sides of the container in which the food stuff is packed and for the purpose of sale inverting the whole container, opening the former bottom thereof whereby the refrigerant is positioned beneath the food and supplies its cooling gases about the sides thereof.

3. A container for holding and preserving foods, comprising a corrugated outer box, an inner liner, a flexible water-proof container lining the box and within the liner, a removable insulating pad consisting of cardboard layers with padding therebetween positioned above the container in the box, an insulated wrapping adapted to contain a freezing compound and a cover plate fitting over the same within the box.

4. A container for holding and preserving foods, comprising a corrugated box, an inner water-proof bag fitting closely to the walls of said box, an insulating pad having corrugated top and bottom elements and padding therebetween, said pad having its ends extending closely to the walls of the box and means adapted to contain a freezing mixture positioned between the top of the box and the insulating pad.

RALPH L. BANGS.